United States Patent
Hassani et al.

(10) Patent No.: US 11,769,313 B2
(45) Date of Patent: Sep. 26, 2023

(54) COUNTERFEIT IMAGE DETECTION

(71) Applicant: Ford Global Technologies, LLC, Dearborn, MI (US)

(72) Inventors: Ali Hassani, Ann Arbor, MI (US); Jonathan Diedrich, Carleton, MI (US); Hafiz Malik, Canton, MI (US); Robert Parenti, Dearborn, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 17/326,490

(22) Filed: May 21, 2021

(65) Prior Publication Data
US 2022/0383021 A1 Dec. 1, 2022

(51) Int. Cl.
G06V 10/143 (2022.01)
G06T 7/44 (2017.01)
G06V 40/16 (2022.01)
G06V 10/60 (2022.01)
G06V 40/40 (2022.01)

(52) U.S. Cl.
CPC ............. *G06V 10/143* (2022.01); *G06T 7/44* (2017.01); *G06V 10/60* (2022.01); *G06V 40/162* (2022.01); *G06V 40/172* (2022.01); *G06V 40/45* (2022.01)

(58) Field of Classification Search
CPC .... G06V 40/172; G06V 40/162; G06V 40/45; G06V 10/60; G06T 7/44
See application file for complete search history.

(56) References Cited

U.S. PATENT DOCUMENTS

| | | | |
|---|---|---|---|
| 6,092,192 A | 7/2000 | Kanevsky et al. |
| 6,879,247 B2 | 4/2005 | Shimomura et al. |
| 6,920,236 B2 | 7/2005 | Prokoski |
| 7,602,947 B1 | 10/2009 | Lemelson et al. |
| 8,300,890 B1 | 10/2012 | Gaikwad et al. |
| 8,374,404 B2 | 2/2013 | Williams et al. |
| 8,718,335 B2 | 5/2014 | Mason et al. |
| 8,725,330 B2 | 5/2014 | Failing |
| 9,886,640 B1 | 2/2018 | Chen et al. |

(Continued)

FOREIGN PATENT DOCUMENTS

| | | | |
|---|---|---|---|
| CN | 202887210 U | 4/2013 |
| CN | 204795370 U | 11/2015 |

(Continued)

OTHER PUBLICATIONS

Chen et al. "Determining Image origin and Integrity Using Sensor Noise", IEEE Transactions on Information Forensics and Security, vol. 3, No. 1, Mar. 2008.

(Continued)

*Primary Examiner* — Edward F Urban
*Assistant Examiner* — Wassim Mahrouka
(74) *Attorney, Agent, or Firm* — Frank Lollo; Bejin Bieneman PLC

(57) ABSTRACT

A computer, including a processor and a memory, the memory including instructions to be executed by the processor to acquire a first image from a first camera by illuminating a first object with a first light and determine an object status as one of a real object or a counterfeit object by comparing a first measure of pixel values corresponding to the first object to a threshold.

20 Claims, 7 Drawing Sheets

(56) References Cited

U.S. PATENT DOCUMENTS

| | | | |
|---|---|---|---|
| 10,169,671 | B2 | 1/2019 | Matsimanis et al. |
| 10,452,894 | B2 | 10/2019 | Zhang et al. |
| 10,769,415 | B1 | 9/2020 | Mostafa et al. |
| 11,030,470 | B2 | 6/2021 | Han et al. |
| 11,113,510 | B1 | 9/2021 | Mostafa et al. |
| 11,178,363 | B1 | 11/2021 | Qian et al. |
| 11,373,449 | B1 | 6/2022 | Genner |
| 11,481,883 | B2 | 10/2022 | Wildermuth et al. |
| 2002/0136435 | A1 | 9/2002 | Prokoski |
| 2006/0102843 | A1 | 5/2006 | Bazakos et al. |
| 2006/0104488 | A1 | 5/2006 | Bazakos et al. |
| 2006/0261931 | A1 | 11/2006 | Cheng |
| 2008/0059027 | A1* | 3/2008 | Farmer ............ B60R 21/01538 701/45 |
| 2010/0102366 | A1 | 4/2010 | Lee et al. |
| 2010/0134250 | A1 | 6/2010 | Chung et al. |
| 2010/0141770 | A1 | 6/2010 | Gomi |
| 2010/0201374 | A1 | 8/2010 | Vasilyev et al. |
| 2010/0208951 | A1 | 8/2010 | Williams et al. |
| 2012/0176810 | A1 | 7/2012 | Galbraith et al. |
| 2012/0189225 | A1 | 7/2012 | Li |
| 2012/0230536 | A1 | 9/2012 | Fridrich et al. |
| 2013/0024123 | A1 | 1/2013 | Ochs et al. |
| 2013/0077958 | A1 | 3/2013 | Xu et al. |
| 2013/0311001 | A1 | 11/2013 | Hampiholi |
| 2013/0342702 | A1 | 12/2013 | Zhang et al. |
| 2013/0342703 | A1 | 12/2013 | Lin |
| 2014/0294262 | A1* | 10/2014 | Schuckers .......... G06V 40/1353 382/125 |
| 2014/0307929 | A1 | 10/2014 | Nechyba et al. |
| 2015/0281599 | A1 | 10/2015 | Slaby et al. |
| 2015/0304612 | A1 | 10/2015 | Richards et al. |
| 2016/0019420 | A1 | 1/2016 | Feng et al. |
| 2016/0019421 | A1 | 1/2016 | Feng et al. |
| 2016/0048736 | A1 | 2/2016 | Chu et al. |
| 2016/0086018 | A1 | 3/2016 | Lemoff |
| 2016/0206216 | A1 | 7/2016 | Kirenko |
| 2017/0091550 | A1 | 3/2017 | Feng et al. |
| 2017/0104916 | A1 | 4/2017 | Mueller |
| 2018/0039845 | A1 | 2/2018 | Chen et al. |
| 2019/0057268 | A1 | 2/2019 | Burge et al. |
| 2019/0057502 | A1 | 2/2019 | Wang et al. |
| 2019/0102873 | A1* | 4/2019 | Wang ..................... G06V 10/40 |
| 2019/0228248 | A1 | 7/2019 | Han et al. |
| 2020/0053297 | A1 | 2/2020 | Tokizaki et al. |
| 2020/0134342 | A1 | 4/2020 | Parupati et al. |
| 2020/0218772 | A1 | 7/2020 | Zhang et al. |
| 2020/0250448 | A1* | 8/2020 | Joshi ..................... G06V 40/45 |
| 2020/0334450 | A1 | 10/2020 | Shen et al. |
| 2020/0342245 | A1 | 10/2020 | Lubin et al. |
| 2021/0049391 | A1 | 2/2021 | Zou et al. |
| 2021/0074138 | A1 | 3/2021 | Micko et al. |
| 2021/0168347 | A1 | 6/2021 | Margolin et al. |
| 2021/0241014 | A1 | 8/2021 | Choiniere |
| 2021/0256281 | A1* | 8/2021 | Henson ................. G06V 40/16 |
| 2022/0012511 | A1 | 1/2022 | Rowe |
| 2022/0398820 | A1 | 12/2022 | Abd-Almageed et al. |
| 2023/0005240 | A1 | 1/2023 | Chen et al. |

FOREIGN PATENT DOCUMENTS

| | | | |
|---|---|---|---|
| CN | 108319986 | A | 7/2018 |
| CN | 110287672 | A | 9/2019 |
| CN | 111611977 | A | 9/2020 |
| CN | 111738065 | A | 10/2020 |
| WO | 2020048140 | A1 | 3/2020 |
| WO | 2021157790 | A1 | 8/2021 |
| WO | 2022134754 | A1 | 6/2022 |

OTHER PUBLICATIONS

Debiasi et al. "PRNU-based Detection of Morphed Face Images", 2018 International Workshop on Biometrics and Forensics (IWBF), 2018.

Non-Final Office Action for U.S. Appl. No. 17/326,460 as issued by the USPTO dated Oct. 19, 2022.

Hermosilla et al., "A comparative study of thermal face recognition methods in unconstrained environments", Pattern Recognition 45 (2012) 2445-2459, doi: 10.1016/j.patcog.2012.01.001.

Kakkirala et al., "Thermal Infrared Face Recognition: A Review", 2017 UKSims-AMSS 19th International Conference on Modelling & Simulation, doi: 10.1109/UKSim.2017.38.

Kkristo et al., "An Overview of Thermal Face Recognition Methods", MIPRO 2018, May 21-25, 2018, Opatija Croatia.

Sanchez-Sanchez et al., "Conventional Neural Network Approach for Multispectral Facial Presentation Attack Detection in Automated Border Control Systems", Entropy 2020, 22, 1296, www.mdpi.com/journal/entropy, doi:10.3390/e22111296.

Spinoulas et al., "Multispectral Biometrics System Framework: Application to Presentation Attack Detection", arXiv:2006.07489v1, Jun. 12, 2020.

Steiner et al., "Reliable Face Anti-Spoofing Using Multispectral SWIR Imaging", 978-1-5090-1869-7/16, copyright 2016 IEEE.

Non-Final Office Action dated Aug. 12, 2022 re U.S. Appl. No. 17/326,511, filed May 21, 2021.

Nagendran, N. et al., "Security and Safety With Facial Recognition Feature for Next Generation Automobiles," International Journal of Recent Technology and Engineering (IJRTE), vol. 7 Issue 4S, Nov. 2018, 6 pages.

Scherhag, U. et al., "Detection of Face Morphing Attacks based on PRNU Analysis," IEEE Transactions on Biometrics, Behavior, and Identity Science (T-BIOM), Oct. 2019, 16 pages.

Mohd Norzali, et al., "Internal State Measurement From Facial Stereo Thermal and Visible Sensors Through SVM Classification," ARPN Journal of Engineering and Applied Sciences, Jan. 2015, 8 pages.

Kim, et al. "A Motion and Similarity-Based Fake Detection Method for Biometric Face Recognition Systems," IEEE Transactions on Consumer Electronics, vol. 57, No. 2, May 2011, 7 pages.

Angelopoulou, E., "The Reflectance Spectrum of Human Skin," University of Pennsylvania, Scholarly Commons, Department of Computer & Information Science, Dec. 20, 1999, 16 pages.

Anderson, R,. et al., "The Optics of Human Skin," The Journal of Investigative Dermatology, vol. 77 , No. J, 1981, 7 pages.

Cooksey, C., et al., "Reflectance Measurements of Human Skin," National Institute of Standards and Technology, Oct. 27, 2020, 3 pages.

Barnes, P. et al., "Spectral Reflectance," U.S. Department of Commerce, Technology Administration, National Institute of Standards and Technology, Mar. 1998, 164 pages.

Mhou, K. et al., "Face Spoof Detection Using Light Reflection in Moderate to Low Lighting," 2nd Asia-Pacific Conference on Intelligent Robot Systems, 2017, 6 pages.

Jacquez, J. et al., "Spectral Reflectance of Human Skin in the Region 0.7-2.6," http://jap.physiology.org/, Sep. 13, 2016, 3 pages.

Cooksey, C. et al., "A collection and statistical analysis of skin reflectance signatures for inherent variability over the 250 nm to 2500 nm spectral range," National Institute of Standards and Technology, Jun. 4, 2014, 2 pages.

Final Office Action for U.S. Appl. No. 17/326,511, filed May 21, 2021, as issued by the USPTO dated Dec. 29, 2022.

Non-Final Office Action for U.S. Appl. No. 17/326,511, filed May 21, 2021, as issued by the USPTO dated Mar. 9, 2023.

Friedrich, "Digital Image Forensics", DOI:10.1109/MSP.2008.931078, IEEE, 2009 (Year: 2009).

Non-Final Office Action dated Jun. 21, 2023 re U.S. Appl. No. 17/326,581, filed May 21, 2021.

Final Office Action dated Jun. 27, 2023 re U.S. Appl. No. 17/326,511, filed May 21, 2021.

\* cited by examiner

COUNTERFEIT IMAGE DETECTION

BACKGROUND

Vehicles can be equipped with computing devices, networks, sensors, and controllers to acquire and/or process data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
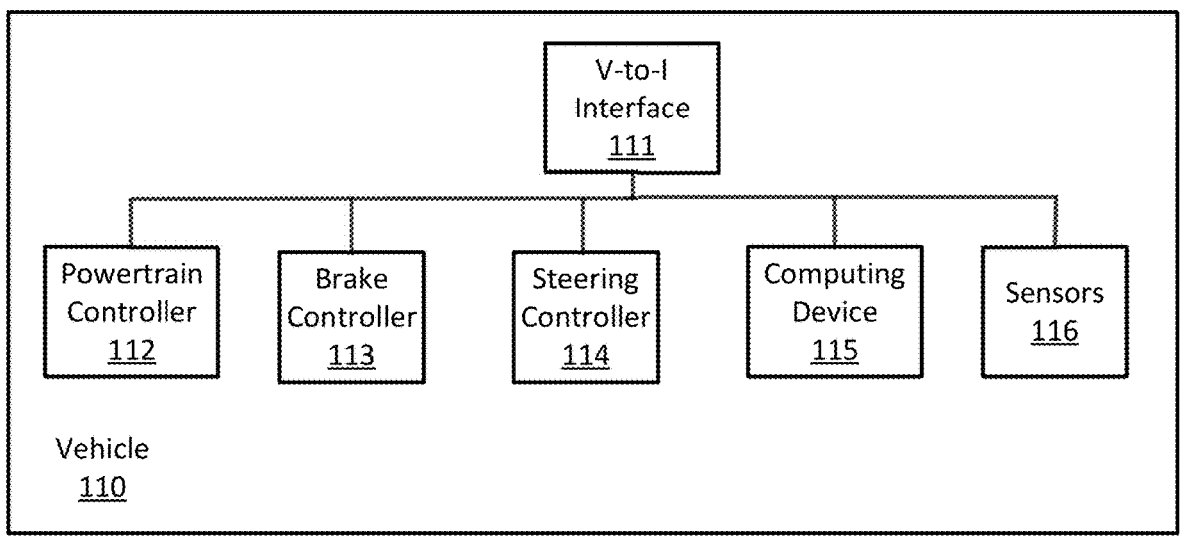
FIG. 1 is a diagram of an example vehicle.

Vehicles can be equipped with computing devices, networks, sensors, and controllers to acquire and/or process data regarding the vehicle's environment and to operate the vehicle based on the data. Computing devices and sensors included can be used for tasks other than operating the vehicle. For example, a camera in a vehicle can be programmed to acquire an image of a human approaching the vehicle and, upon determining the identity of the human based on facial recognition software, unlock the vehicle's doors to permit the operator to enter the vehicle. Likewise, cameras included in the interior of the vehicle can acquire one or more images of a human and, upon determining the identity of the operator based on facial recognition software, accept commands from the human to operate the vehicle.

A computing device can be programmed to perform facial recognition of a human by first acquiring a trained model during enrollment, where an image of the human face to be identified is initially acquired. The computing device can then acquire a challenge image that includes a human face and process the challenge image to determine whether the challenge image includes a human face that matches the trained model. Facial recognition is a type of biometric authentication, where human body measurements are used to determine an identity of a human to perform access control. Biometric authentication can be used to control access to buildings, homes, or vehicles, and can be used to grant permission to operate computers, cell phones, or other devices. Biometric authentication software can be executed on a computing device included in the location or device being accessed, or the image data can be uploaded to a cloud-based server that maintains a database of trained models for execution. An example of biometric authentication software is facial identification software, for example Face Tracker. Face Tracker is a facial recognition software library written in C++ and available on facetracker.net under the MIT software license. The results of performing the biometric authentication can be downloaded to the device seeking authentication and permission to operate or access the location or device can be granted or denied.

Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Successful authentication can be used to unlock a vehicle door or enable vehicle controls. In other examples, successful authentication can be used for security applications such as access to a location or room by unlocking a door, or yet further alternatively or additionally access to a device such as a computer by enabling input devices like a keyboard or mouse or granting access to files.

A difficulty with biometric facial recognition can be "spoofing." Spoofing occurs when a non-authorized user seeks to gain access to a location or device using a counterfeit version of an authorized user's facial features. Counterfeit versions of an authorized user's facial features can include color photographs or life-like masks, for example. Biometric facial recognition systems can use three-dimensional sensors such as laser range detectors or lidars to prevent a non-authorized user from using a flat, two-dimensional photograph to spoof the system. Non-authorized users have attempted to circumvent biometric facial recognition systems by using three-dimensional (3D) masks that conform a user's general facial shape while including facial features belonging to an authorized user. These masks can range from inexpensive printed LYCRA® face masks to custom-made silicon face masks used in motion pictures, for example.

Techniques discussed herein improve biometric facial recognition by using spectral characteristics of human facial features to determine liveness. Liveness means that image data represents a real human face. Liveness authentication means distinguishing between a real human face and a counterfeit image, where a counterfeit image can be an image of a photograph or a mask designed to imitate a human face. Without liveness determination, a biometric authorization system can be spoofed or fooling into authorizing a counterfeit image including a picture of a human face or mask corresponding to a human face. These techniques illuminate the challenge human face with controlled illumination and acquire an image with an image sensor to form an image. Controlled illumination is illumination that has specified spectral content emitted at a specified intensity. The controlled illumination can be a single wavelength or a combination of wavelengths in the ultraviolet band (10 nm-400 nm), the visible band (400 nm-700 nm), the near infrared band (700 nm-1400 nm), or the short wave infrared band (1400 nm-3000 nm). Acquisition of illumination outside of visible and near infrared bands will typically require sensors and optics designed for the specific wavelengths to be acquired.

Controlled illumination permits pixel values in the acquired image to be measured and compared to measurements determined based on a previously acquired enrollment image to determine whether a face in the challenge image belongs to a live human or a counterfeit reproduction. The enrollment image is typically acquired with the same camera and the same controlled illumination as the challenge image. If a different camera and/or light is used, the measurements used to determine liveness can be adjusted based on measured differences in the image data due to different cameras and lighting. If it is determined that the face belongs to a live human, a visible light image of the real human face can be acquired and passed onto facial recognition software for facial recognition processing, otherwise access is denied.

FIG. 1 is a diagram of a vehicle 110 including a computing device 115 and sensors 116. The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH®, Ultra-Wide Band (UWB)® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc. Using data received in the computing device 115, e.g., the sensor data from the sensors 116, the server computer, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to share data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110.

The vehicle 110 is generally a land-based vehicle 110 capable of operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
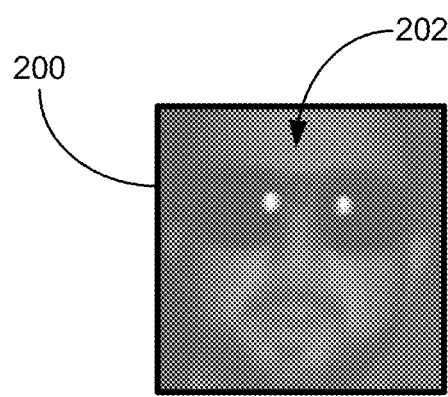
FIG. 2 is a diagram of an example near infrared image.

FIG. 2 is a diagram of an image 200 that includes a human face 202. Image 200 is acquired by a camera of a scene illuminated by illumination which could be one or more wavelengths of near infrared light (NIR) illumination, short wavelength infrared light (SWIR) illumination, visible light illumination or ultraviolet light (UV) illumination, image 200 can be acquired by a camera and communicated to a computing device 115. The camera can include a solid state image sensor that can acquire light at the wavelengths emitted by the controlled illumination. The image 200 can also be acquired by determining a ratio of wavelengths. For example, a camera can have two image sensors arranged to view the same field of view and each with a bandwidth filter that transmits light in a narrow band of wavelengths centered about two different wavelengths, for example dichroic filters. The image 200 can be acquired by illuminating the scene with broadband illumination that includes both wavelengths and acquiring the two different wavelengths with the two image sensors. The corresponding pixels of the resulting images can be subtracted to form image 200 as a difference image. An image 200 can be determined by acquiring two NIR images having wavelengths of 850 and 940 nm, for example. An image 200 can be determined that includes pixels corresponding to the difference between light acquired at the two wavelengths.

Still image cameras and video cameras are available that includes RGB filtered photo sites in addition to unfiltered photo sites in a mosaic arrangement to produce images that include both red, green, and blue (RGB) pixel channels and an NIR pixel channel to generate an RGB/NIR image. An NIR image can be extracted from an RGB/NIR image by extracting data from the NIR channel only. Techniques discussed herein use responses of real and counterfeit objects to controlled illumination to distinguish real from counterfeit objects. Although NIR illumination and images as are used as an example of illumination that can be used to separate images of real objects from counterfeit objects, other spectral ranges of light can be used to separate real objects from counterfeit objects. For example, ratios of responses to red and blue light can be used to separate counterfeit objects from real objects. Separation of real and counterfeit images can be performed with other wavelengths and combinations of wavelengths of light from SWIR through NIR and visible light up to ultraviolet wavelengths. Use of NIR has advantages including low cost equipment and freedom from ambient noise in most environments, which can reduce computational resources required to distinguish real from counterfeit objects.

Figure 3:
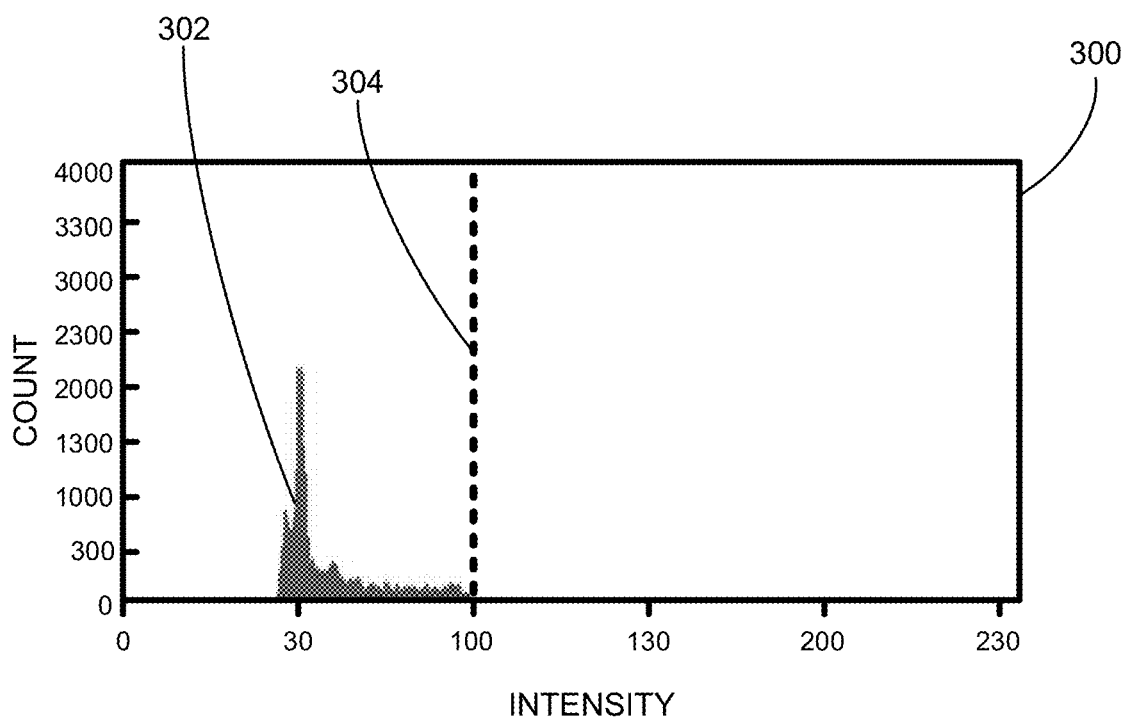
FIG. 3 is a diagram of an example histogram of a near infrared image.

FIG. 3 is a diagram of a histogram 300 of pixel values 302 from an image 200 from FIG. 2, for example. The histogram 300 includes a graph that plots pixel intensities on the x-axis vs. pixel count for the pixel intensities on the y-axis. A threshold 304 can be determined to which pixel values 302 of images 200 can be compared to when the images 200 include human faces 202. Techniques described herein can acquire a first image 200 of a user, called an enrollment image 200, to be used at a later time when the user is seeking access to a vehicle, area, or device. The enrollment image 200 is processed to generate a histogram 300 and a threshold 304 is determined based on determining a z-score for pixel values 302. A z-score is a measure of statistical difference and is determined by calculating a mean and standard deviation for the distribution of pixel values 302. The z-score measures a distance between the mean pixel value 302 and a threshold 304 in terms of standard deviations. The threshold 304 can be set at a value below which, given the mean and standard deviation of the pixel value 302 distribution, a specified percentage of are expected to occur. For example, assuming a Gaussian distribution, a threshold 304 set at two standard deviations above the mean can be expected to be greater than 97.6% of the pixel values 302. A threshold 304 set at three standard deviations above the mean can be expected to be greater than 99.8% of the pixel values 302. Assuming that the threshold 304 is set at three standard deviations above the mean, at a later time, when the user is seeking access to the vehicle, area, or device, a second image 200 can be acquired using the same camera and lighting. The assumption is that acquiring a second or challenge image using the same camera using the same controlled illumination will generate a histogram in which the mean of the pixel values will occur three standard deviations below the threshold 304. A second histogram 300 can be generated from the pixels of the second image 200 corresponding to the user's face and compared to the threshold 304. If the mean of the pixel values 302 in the second histogram are less than three standard deviations below the threshold 304, the object in the second image 200 is determined to be real and thereby correspond to a live human face. If the mean of the pixel values in the histogram are not three standard deviations below the threshold 304, the image is determined to include a counterfeit object.

The threshold 304 can be improved by acquiring a plurality of images 200 of a plurality of human faces. The plurality of images 200 can be acquired in a laboratory using a different camera and different controlled illumination. The pixel values 302 corresponding to the plurality human faces can be adjusted to compensate for differences in cameras and lighting between the laboratory and the real world camera and lighting used to determine the enrollment and challenge images. A threshold 304 can be determined based on the mean and standard deviation of pixel values 302. A threshold 304 determined to be three standard deviations above the mean can be expected to be greater than more than 99% of the pixel values 302 in the images of real faces. The intensity of controlled illumination in both the laboratory and the real world can be measured and the threshold 304 and the number of standard deviations the mean pixel value 302 is required to be below the threshold 304 can be adjusted to compensate for differences in lighting intensities, for example. The threshold 304 and the number of standard deviations can also be adjusted by expected differences in ambient illumination between enrollment images and challenge images. For example, if an enrollment image is acquired at the exterior or a vehicle in daylight, the reflectance of a human face to controlled illumination would be different than an image of the same human face acquired in the interior of a vehicle at night. A liveness determination system as described herein can determine both ambient and supplied levels of illumination and adjust the threshold 304 to compensate for differing levels of illumination.

Techniques discussed herein can also perform image segmentation on acquired images to separate human faces into regions. Image segmentation is an image processing technique for separating images into regions based on similarities in pixel values, shape and texture. For example, a human face can be segmented to separate regions such as skin, lips, hair, and eyes. A histogram of each region can be generated for an enrollment image and compared to similar regions in a challenge image. Mean and standard deviations can be calculated for each segmented region in the challenge image and can be compared to a separate threshold 304 for each segmented region. Comparison of enrollment images and challenge images based on segmenting the enrollment and challenge images can be expected to be more accurate than just comparing the pixel values 302 corresponding to skin alone.

Determining liveness based on pixel values 302 and thresholds 304 is based on the observation that real human faces generally absorb more incident controlled illumination than counterfeits. For example, photographs are typically processed with infrared coatings that reflect NIR illumination. Nylon, a fabric used to make photographic human masks reflects most NIR light. Ability to reflect NIR light distinguishes counterfeit facial images from real human faces well enough to permit techniques discussed herein to determine liveness of real human faces based on thresholding histograms of NIR images.

Figure 4:
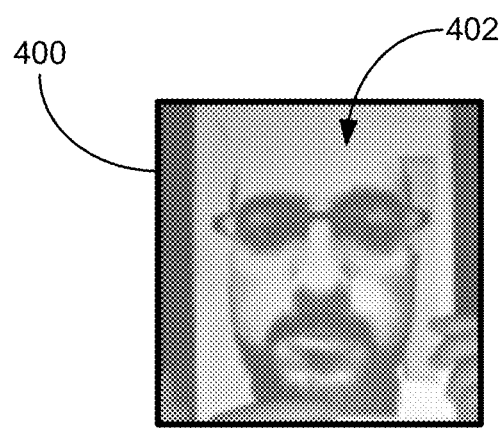
FIG. 4 is a diagram of an example near infrared counterfeit image.

FIG. 4 is a diagram of an image 400 that includes a counterfeit image 402 of a human face. The counterfeit image 402 of a human face in this example is generated by holding a life-sized color photograph of a human face in the field of view of a camera. A counterfeit image such as the image 402, that reproduces the size, shape and textures included in a real image of a human face, can be input to a biometric authorization system that performs facial identification and could be identified as a live human despite being a photograph of a human face. Techniques discussed herein determine liveness of an image of a human face to prevent spoofing of a biometric authorization system by generating a measure of pixel values in an image of a human face and comparing it to previously formed measures to determine liveness.

Figure 5:
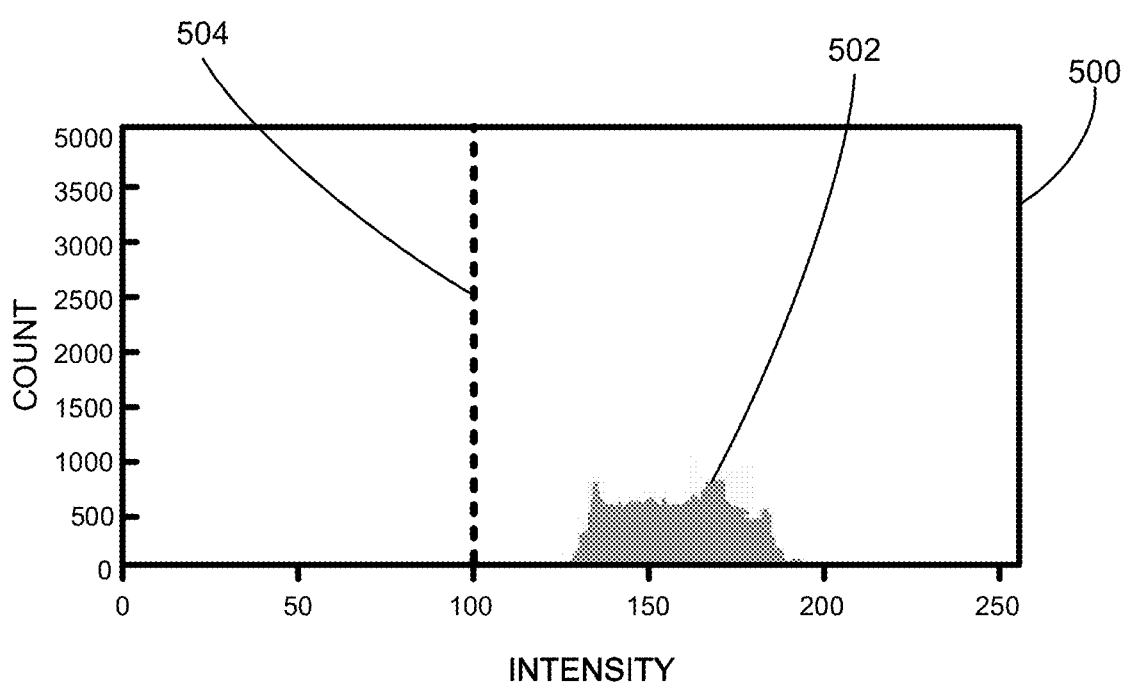
FIG. 5 is a diagram of an example histogram of a near infrared counterfeit image.

FIG. 5 is a diagram of a histogram 500 of pixel values 502 in an image 400 that includes a counterfeit image 402 of a human face. The histogram 500 includes a graph that plots pixel intensities on the x-axis vs. pixel count for the pixel intensities on the y-axis. A mean and standard deviation can be determined based on pixel values 502. A threshold 504 can be selected above which mean pixel values 502 of a plurality of images 400 will be a specified number of standard deviations are above. When the mean pixel values 502 in a histogram 500 of images 400 are determined to be greater than a specified number of standard deviations above a threshold 504, the image 400 can be determined to be counterfeit. The counterfeit image 400 can include photographs, photographic spandex masks, and silicone masks, for example. Photographic spandex masks are fabric masks with high-resolution color photographs of a human face printed on them. Real human faces 202 can be separated from counterfeit images of human faces 402 by empirically determining the threshold 504 below which mean pixel values 302 corresponding to real human faces 202 typically occur, and above which mean pixel values 502 corresponding to counterfeit images 402 typically occur based on the standard deviations of the distributions of pixel values.

The selection of a threshold 304 to separate images that include real human faces from images that include counterfeit human faces can be improved by acquiring a plurality of images of counterfeit images 400 and adjusting the histogram 500 based on analysis of pixel values from the counterfeit images 400. As discussed above in relation to FIG. 3, a plurality of images of counterfeit human faces 402, including photographic counterfeits and mask counterfeits can be acquired and histograms 500 determined for the counterfeit images 400. A counterfeit threshold 504 can be determined by calculating a mean and standard deviation for the distribution of pixel values and selecting a threshold based on the mean and standard deviation at which 99% of the pixel values in the counterfeit images can be expected to occur, for example. The counterfeit threshold 504 can be combined with the real image threshold 304 determined above in relation to FIG. 3 by averaging, for example. Analysis of a plurality of counterfeit images 400 can permit the threshold 304 to be raised, thereby increasing the probability that a real human face 302 will be determined to be live without increasing the probability that a counterfeit image 400 will be accepted as real.

Techniques discussed herein can improve determination of liveness in images 200, 400 by using image processing software to detect the outlines of human faces in an image. Image processing software that can determine an outline of a human face is included in Dlib, a toolkit containing machine learning algorithms and tools for creating complex software in C++. Dlib is available at Github.com and is available on an open source license which permits its use free of charge. Dlib includes a routine called Get_Frontal_Face_Detector which is a routine that is configured to find a human face that is looking more or less towards a camera. A face can be detected in an image 200, 400, and an offset between the center of the face and a center of the image 200, 400 can be determined. The offset can be used to adjust the pixel values 302, 502 in a histogram 300, 500 of the image 200, 400 to account for image background pixels, for example. Image background pixels include pixel values that do not correspond to human skin, and therefore can be regarded as extraneous noise Eliminating background pixels can improve the accuracy of liveness determination of human faces using the thresholding technique discussed above in relation to FIGS. 2-5, above, applied to measures of pixel values in the offset images.

Another technique for improving the determination of liveness in an image of a human face is to compensate for the angle of a face to the camera. Techniques discussed herein can depend upon pixel values of image data. Pixel values of pixels corresponding to human faces can depend upon the angle of a human face to the camera. For example, a human face at an angle of 45 degrees to a camera, i.e. facing away from a head-on direction, can reflect light differently than a human face looking directly at the camera. The change in pixel intensities due to facial angle with respect to the camera can be measured empirically and use to correct the pixel intensities in a histogram based on a measured facial angle. Facial angle can be measured using a Dlib software routine called Get_Surf_Points to detect facial features. Get_Surf_Points facial features by detecting image pixel values that form edges and corners, for example. Facial features can include locations such as the inner and outer corners of the eyes and corners of the mouth, for example. One example technique to detect a facial angle is to detect a feature corresponding to the tip of the nose and measure distance from the tip of the nose feature to the features corresponding to the corners of the mouth. The ratio of distances between features at the center of the face such as the tip of the nose to features located on either side of the face such as the corners of the mouth can be used to determine facial angle, for example. Compensating for angle of a face to a camera can improve the accuracy of liveness determination of human faces using the thresholding technique discussed above in relation to FIGS. 2-5, above, applied to measures of pixel values in the angle compensated images.

Another technique to distinguish between images of real human faces 202 and counterfeit images 402 of human faces is to measure image texture using a Gabor texture filter. A Gabor texture filter is a measure of the change in pixel intensities over small distances in an image. A two dimensional Gabor texture filter $G_c[i, j]$, $G_s[i, j]$ can be determined by calculating two functions:

$$G_c[i, j] = Be^{-\frac{(i^2+j^2)}{2\sigma^2}} \cos(2\pi f(i\cos\theta + j\sin\theta)) \quad (1)$$

$$G_s[i, j] = Ce^{-\frac{(i^2+j^2)}{2\sigma^2}} \sin(2\pi f(i\cos\theta + j\sin\theta)) \quad (2)$$

Where, i, j are pixel values, B and C are normalizing values determined based on the image data, f defines the frequency of the texture being looked for, $\theta$ is the angle corresponding to the texture orientation and $\sigma$ is the size of the region being analyzed. Gabor texture filters are sensitive to the spatial frequencies corresponding to the pixel values in an image and can be used instead of histogram analysis or along with histogram analysis to distinguish between real and counterfeit human faces.

Figure 6:
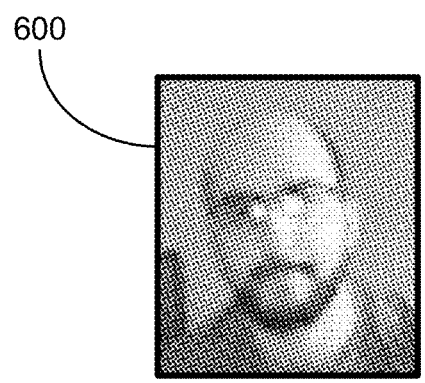
FIG. 6 is a diagram of an example visible light image.

FIG. 6 is a grayscale or RGB color image 600 of a human face acquired using a grayscale or color camera. The grayscale or RGB color image can be acquired by a camera and communicated to a computing device 115. The grayscale or RGB color image can be output by the computing device 115 to a biometric authentication system following determination that an image 200 includes a live human face, e.g., successful liveness determination. The biometric authentication system can be software executing on the computing device 115 and can include human facial recognition as discussed above. In examples where computing device 115 determines that an acquired image 400 includes a counterfeit image 402 of a human face, the grayscale or RGB color image is not output to a biometric authentication system and no human facial recognition is performed. In examples of techniques for determining liveness, measures of pixel values can be performed on the grayscale or RGB color images instead of or in addition to measures of pixel values in images.

Techniques discussed herein can improve biometric authentication by determining liveness of an image of a human face. In some examples, liveness can be determined by first determining measures of pixel values as discussed in relation to FIGS. 3 and 5 above in enrollment images. The measures of pixel values, which can be a threshold, or a Markov sequence measure, can be stored in memory included in a computing device 115. At a later time, if and when the person to be authenticated appears in the field of view of the camera, a challenge image is acquired. Measures of pixel values in the challenge image is performed and compared to the stored measures to determine liveness in the challenge images. Techniques discussed herein improve liveness determination by increasing computational efficiency of facial authentication by avoiding expending computational resources required to process 3D sensor data corresponding to a human face. Techniques discussed herein also improve liveness determination by avoiding the computational resources required to determine counterfeit images using image processing techniques to detect the edges of edited regions in photographs, for example. In some examples, deep neural networks or cloud-based databases of known counterfeits are required to determine counterfeit images.

The techniques discussed herein regarding counterfeit image detection can be subject to reinforcement learning. Reinforcement learning is performed by keeping statistics regarding the number of correct and incorrect results achieved by a counterfeit image detection system in use and using the statistical results to re-train the counterfeit image detection system. For example, assume a counterfeit image detection system is used as input to a biometric authorization system used to unlock a vehicle, building, or device when approached by a valid user. A valid user is a user with prearranged permission to use the vehicle, building, or device. In an example where the counterfeit image detection system fails to correctly verify a camera and unlock the vehicle, the user can be forced to unlock the vehicle manually with a key or fob, or use a 2-factor authorization system such as entering a code sent to a cell phone number. When a user is forced to unlock the vehicle manually, the counterfeit image detection system can store data regarding the incorrect camera source data including the image of the user.

Determining what to do with data regarding the incorrect counterfeit image detection can be based on a reward system. A reward system retrains the counterfeit image detection system corresponding to the counterfeit image detection data depending upon the outcome of the failure to authenticate. If the potential user fails to gain access to the vehicle, it is assumed that the failed attempt was an attempted spoof, and the data is appended to a training dataset of likely spoof data. If the potential user gains access using one of the manual approaches, for example keys, fobs, or 2-factor authorization, the data is appended to a training dataset of false negatives to be corrected in the training process. The authentication system can be retrained based on the updated training dataset periodically or when the number of new counterfeit image detection datasets added to the training dataset exceeds a user-determined threshold. Retraining can be applied to both deterministic authentication systems based on Gaussian parameters and deep neural network-based systems.

Data regarding failure to verify counterfeit image detection can be federated or shared among a plurality of vehicles. The data regarding failure to verify counterfeit image detection can be uploaded to a cloud-based server that includes a central repository of training datasets. The uploaded verify a camera source datasets and corresponding outcomes can be aggregated in updated training datasets and results of retraining based on the new data can be compared to results for the previous training. If the new training dataset improves performance, the new trained model can be pushed or downloaded to vehicles using the counterfeit image detection system. Note that no personal data regarding users' identities needs to be uploaded to the cloud-based servers, only camera source verification datasets and outcomes. By federating new trained models based on training data uploaded from a plurality of locations, performance of a counterfeit image detection system can be continuously improved over the lifetime of the system.

Figure 7:
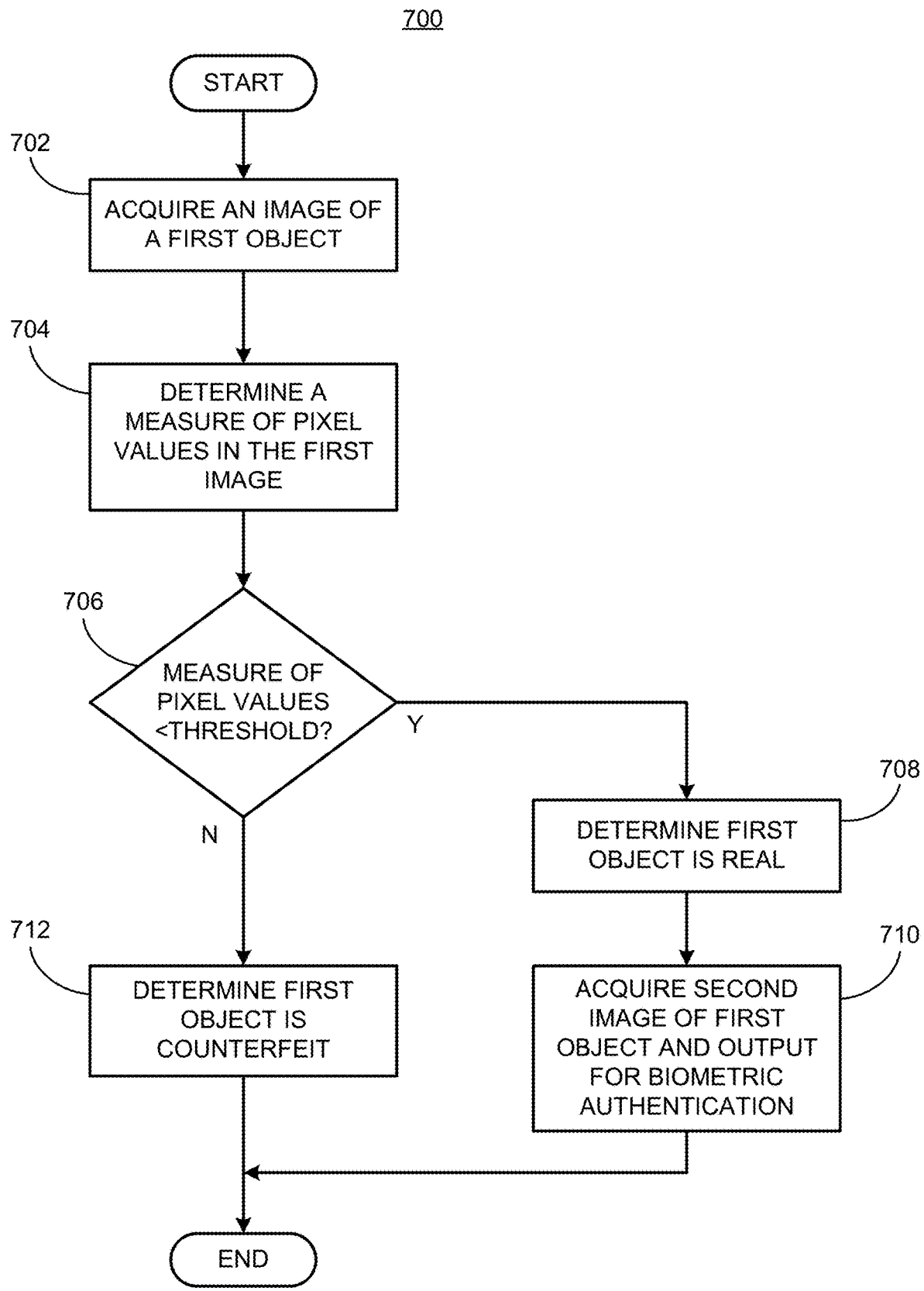
FIG. 7 is a flowchart diagram of an example process to determine near infrared counterfeit images.

FIG. 7 is a diagram of a flowchart, described in relation to FIGS. 1-6, of a process for authenticating subject liveness from an image 200, 400. Process 700 can be implemented by a processor of a computing device such as a computing device 115, taking as input information from sensors, and executing commands, and outputting object information, for example. Process 700 includes multiple blocks that can be executed in the illustrated order. Process 700 could alternatively or additionally include fewer blocks or can include the blocks executed in different orders.

Process 700 begins at block 702, where a computing device 115 acquires one or more first image 200, 400 of an object, for example a human face, from a camera as discussed above in relation to FIGS. 2 and 4. The first image can be an image acquired using a camera and controlled illumination. The first image can be acquired in response to a user seeking access to a vehicle, area, or device and can be referred to as a challenge image.

At block 704 measures of the pixel data included in the first image 200, 400 is performed by the computing device 115 as discussed in relation to FIG. 3, above. The measures can be based on a histogram and can be a mean value and the standard deviation of pixel values corresponding to the user's face. The measure can also be measures based on a Gabor texture filter.

At block 706 the measures of the pixel data included in the first image 200, 400 is determined in at block 704 is compared to a threshold value. For example, the number of standard deviations that the mean is above or below the threshold can be determined. The threshold value is determined based on an enrollment image as discussed above in relation to FIGS. 3, 4, and 5, above. At block 706, process 700 determines an object status for the object included in the first image 200, 400. If the measures of pixel data based on the first image 200, 400 are a predetermined number of standard deviations less than the threshold, the object status is determined to be "real object" and process 700 passes to block 708. If the mean pixel data based on the first image 200, 400 is a predetermined number of standard deviations greater than or equal to the threshold, the object status is determined to be "counterfeit object" and process 700 passes to block 712.

At block 708, process 700 has determined that the object status of the first image 200, 400 is real object, and in this example the first image 200, 400 includes a live human face.

At block 710, process 700 acquires a second image 600 of the user seeking access to the vehicle, area, or device. The second image can be a grayscale or RBG color image 600. The second image 600 can be passed to a facial identification system as discussed above in relation to FIG. 7 for biometric authentication of the user. Following successful biometric authentication, the user can be granted access to the vehicle, area, or device. Following block 710 process 700 ends.

At block 712, process 700 has determined that the object status of the first object is counterfeit object. In this context, this can mean that the first object is a photograph of a human face or a mask of a human face and is being used to spoof a biometric authentication system. In examples where the object status is determined to be counterfeit object, no second image 600 is acquired, and no image is passed to a biometric authentication system. Following block 712 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
 a processor; and
 a memory, the memory including instructions executable by the processor to:
  acquire a first image from a first camera by illuminating a first object with a first light;
  determine a first measure of pixel values based on the first object;
  acquire a second image of a second object with the first camera by illuminating the second object with the first light, wherein the second object is a real object;

determine a second measure of pixel values based on the second object in the second image, wherein the second measure of pixel values is based on a second mean and second standard deviation of pixel values corresponding to the second object in the second image;

determine a threshold by determining a second number of second standard deviations below which the second mean of pixel values corresponding to the second object occurs; and determine an object status as one of a real object or a counterfeit object by comparing the first measure of pixel values based on the first object to the threshold.

2. The method of claim 1, wherein the first light includes two wavelengths of light and pixels included the first image correspond to differences between the two wavelengths.

3. The computer of claim 1, the instructions including further instructions to:

acquire a plurality of third images with a second camera by illuminating a plurality of third objects with a second light, wherein the plurality of third objects are real objects;

determine a plurality of third means and third standard deviations of pixel values corresponding to the plurality of third objects in the plurality of third images with a second computer;

determine a second threshold by determining a third number of second standard deviations below which the third means of pixel values corresponding to the third objects occur; and adjust the second threshold based on a difference between the first light and the second light.

4. The computer of claim 3, the instructions including further instructions to:

acquire a plurality of fourth images with a third camera by illuminating a plurality of fourth objects with a third light, wherein the plurality of fourth objects are counterfeit objects;

determine a plurality of fourth means and fourth standard deviations of pixel values corresponding to the plurality of fourth objects in the plurality of fourth images with a third computer;

determine a third threshold by determining a fourth number of standard deviations above which the fourth means of pixel values corresponding to the fourth objects occur; and adjust the third threshold based on a difference between the first light and the third light.

5. The computer of claim 1, wherein the first light includes one or more wavelengths of short wave infrared light, near infrared light, visible light and ultraviolet light.

6. The computer of claim 4, the instructions including further instructions to, when the first object is a human face and is determined to be the real object, perform facial identification on the human face by acquiring a fifth image using a fourth light that includes visible light.

7. The computer of claim 1, the instructions including further instructions to permit access to a vehicle, an area, or a device based on determining the object status.

8. The computer of claim 1, wherein the first measure of pixel values includes a first mean and first standard deviation of pixel values in a histogram.

9. The computer of claim 1, wherein the first measure of pixel values is a measure of image texture based on a Gabor texture filter.

10. The computer of claim 1, wherein the first light includes two wavelengths of light and pixels included the first image correspond to differences between the two wavelengths.

11. The computer of claim 1, the instructions including further instructions to adjust the threshold based on determining an offset between the center of the first object and the center of the first image.

12. The computer of claim 1, the instructions including further instructions to adjust the threshold based on determining an angle at which the first object is facing with respect to the first camera.

13. A method, comprising:

acquiring a first image from a first camera by illuminating a first object with a first light;

determining a first measure of pixel values based on the first object;

acquiring a second image of a second object with the first camera by illuminating the second object with the first light, wherein the second object is the real object;

determining a second measure of pixel values based on the second object in the second image, wherein the second measure of pixel values is based on a second mean and second standard deviation of pixel values corresponding to the second object in the second image;

determining a threshold by determining a second number of second standard deviations below which the second mean of pixel values corresponding to the second object occurs; and determining an object status as one of a real object or a counterfeit object by comparing the first measure of pixel values based on the first object to the threshold.

14. The method of claim 13, wherein the first measure of pixel values is a measure of image texture based on a Gabor texture filter.

15. The method of claim 13, further comprising:

acquiring a plurality of third images with a second camera by illuminating a plurality of third objects with a second light, wherein the plurality of third objects are real objects;

determining a plurality of third means and third standard deviations of pixel values corresponding to the plurality of third objects in the plurality of third images with a second computer;

determining a second threshold by determining a third number of second standard deviations below which the third means of pixel values occur corresponding to the third objects; and adjusting the second threshold based on a difference between the first light and the second light.

16. The method of claim 15, further comprising:

acquiring a plurality of fourth images with a third camera by illuminating a plurality of fourth objects with a third light, wherein the plurality of fourth objects are counterfeit objects;

determining a plurality of fourth means and fourth standard deviations of pixel values corresponding to the plurality of fourth objects in the plurality of fourth images with a third computer;

determining a third threshold by determining a fourth number of standard deviations above which the fourth means of pixel values corresponding to the fourth objects occur; and adjusting the third threshold based on a difference between the first light and the third light.

17. The method of claim 13, wherein the first light includes two wavelengths of light and pixels included the first image correspond to differences between the two wavelengths.

18. The method of claim 16, further comprising, when the first object is a human face and is determined to be the real object, perform facial identification on the human face by acquiring a fifth image using a fourth light that includes visible light.

19. The method of claim 13, further comprising permitting access to a vehicle, an area, or a device based on determining the object status.

20. The method of claim 13, wherein the first measure of pixel values includes a first mean and first standard deviation of pixel values in a histogram.

* * * * *